United States Patent Office 2,767,804
Patented Oct. 23, 1956

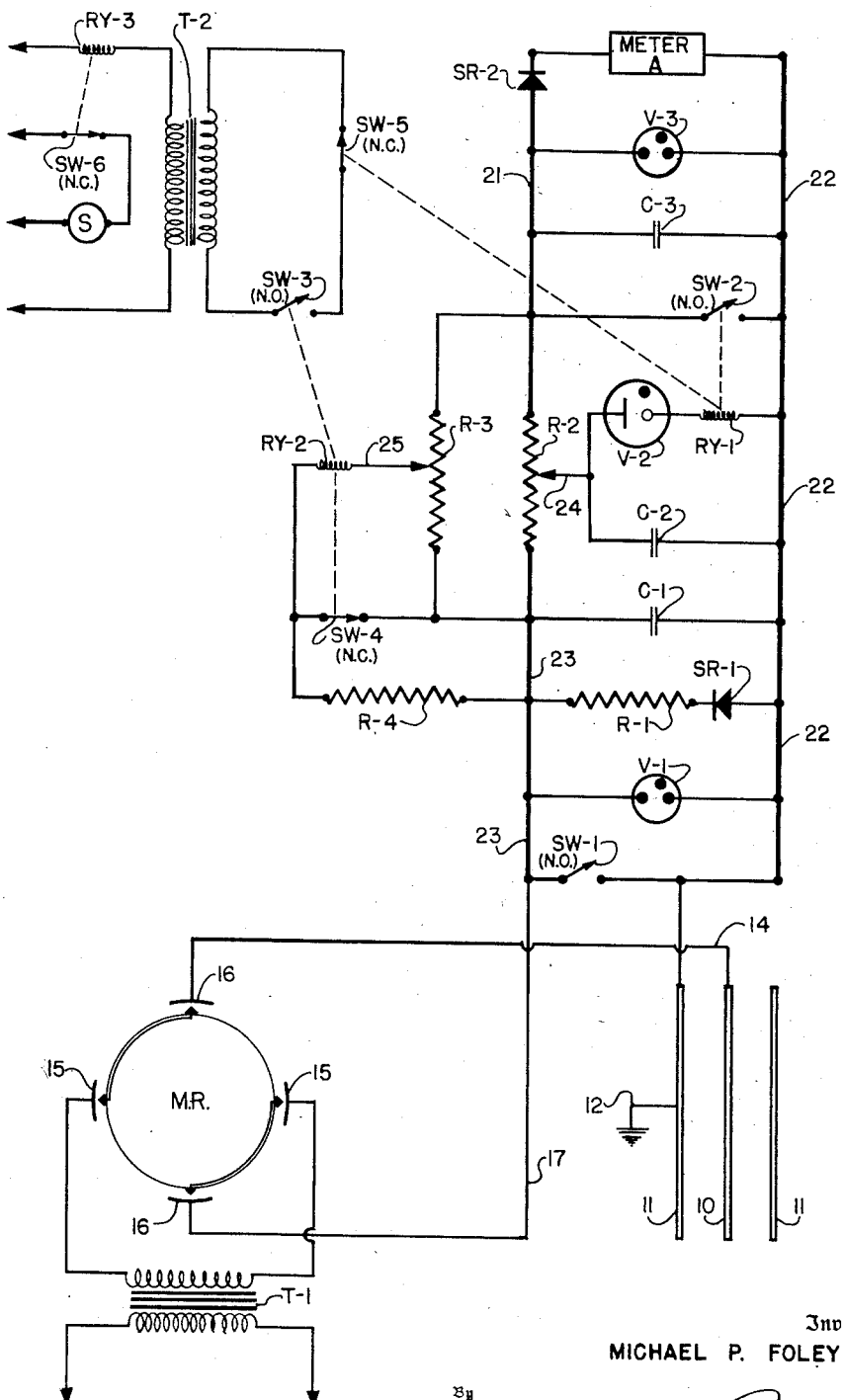

2,767,804

METER PROTECTION AND SIGNAL CIRCUIT FOR ELECTRIC PRECIPITATORS

Michael P. Foley, North Hollywood, Calif., assignor to Western Precipitation Corporation, Los Angeles, Calif., a corporation of California Application March 23, 1953, Serial No. 344,033

8 Claims. (Cl. 183—7)

The present invention relates generally to electrical precipitators that collect or remove particles suspended in a stream of gas, and more particularly to improvements in the electrical circuit energizing such a precipitator.

It is desirable to place an electrically operated device such as a signal or a meter or other current responsive instrument in the electric circuit of a precipitator in order to obtain an indication or adjustment of operating conditions. As illustrative of such devices, but without limiting the invention thereto, it may be desired to place a recording meter in the circuit in order to obtain a continuous record of current flow between the discharge and collecting electrodes. Likewise, an audible or visual signal mechanism may be operated by changing current to indicate underload or overload conditions or a feedback may be obtained for output adjustment. No problem is generally encountered in placing devices of this character in the power supply primary circuit which is maintained at a relatively low voltage. But since the power supply primary circuit is separated by a high voltage transformer and a rectifier from the electrodes of the precipitator, conditions in the low voltage supply circuit are not always accurately indicative of conditions in the high voltage part of the circuit within the precipitator and consequently a meter placed in the power supply primary circuit cannot be relied upon to give the proper readings.

To obtain readings or indications which are valid under all conditions, the signal or meter unit should be placed on the secondary side of the power supply circuit which operates at a relatively elevated voltage, normally several thousand volts. The current in this circuit, however, is usually a pulsating direct current including both low and high frequency current components, and accordingly one basic difficulty with placing instruments in the circuit at this location is that the current fluctuations are of much too short a duration to actuate any standard type of meter or any signal unit, the inertia of the mechanical parts of the meter not permitting it to respond to the rapid fluctuations in current value.

A further difficulty with placing known types of instruments in the secondary circuit is that the current is subject to sudden surges. Operating conditions within the precipitator are not always uniform and are ordinary disturbed by intermittent arcing between the electrodes. As a result, heavy transient surges are present in the secondary circuit that soon burn out any standard type of instrument which is merely placed in series with the high voltage electrodes without adequate protective devices.

It is, accordingly, a general object of my invention to provide in an electric circuit for a precipitator means which permit placing a standard type of current responsive instrument, such as a meter or signal unit, in the secondary circuit of the electrical precipitator to obtain a direct indication of current flowing in the circuit, said means including elements which protect the meter from being burned out by current surges of abnormal magnitude or by high frequency currents, or the like.

Another object is to provide, in combination, means for preventing reverse current flow through said meter.

A further object is to provide in the precipitator circuit means for substantially eliminating the effects on the meter of low and high frequency signals inherent in the secondary circuit of the precipitator, thereby providing a more accurate meter reading.

The above and other objects and advantages of my invention are attained according to my invention by connecting a circuit, containing a suitable current responsive instrument, in series with one of the electrodes of an electrical precipitator and the source of high voltage current, which source is ordinarily a suitable type of rectifier. The rectifier receives high voltage alternating from a step-up transformer and produces a unidirectional or rectified current. In a specific embodiment of my invention, the current responsive instrument is a recording ammeter which continuously measures and records the current flowing between the electrodes of the precipitator.

The circuit containing the meter is on the grounded side of the rectifier and is provided with various protective means that enable the meter to operate in the circuit as a permanent part of the precipitator energizing circuit without being damaged by overloads, reverse currents, high frequencies, surges, and other unfavorable conditions that may exist. It is preferable to include a combined underload and overload section of the meter circuit having signal means to signal an operator that the current between the precipitator electrodes is outside a predetermined range desired for best operation. This combined section is electrically separate from but mechanically connected to the remainder of the circuit and includes an isolation transformer to comply with safety codes. A known but adjustable fraction of the current passing through the meter is used to control actuation of the signal means in response to underload conditions while the presence of overload current in a protective shunt around the meter controls actuation of the same signal means in response to overload conditions. This signal section may of course be omitted without impairing the operation of the remainder of the circuit.

How the above and other objects of my invention are attained will be better understood by reference to the following description and the annexed drawing which consists of a single schematic diagram of my novel circuit.

My improved protective circuit is used in conjunction with a conventional power supply to a precipitator which is here illustrated diagrammatically at the lower end of the drawing. The precipitator normally consists of one or more high voltage discharge electrodes 10 which are each opposed by one or more non-discharge or collecting electrodes 11 usually connected to ground as at 12. Gases from which particles are to be precipitated are directed between these electrodes and are thus acted on by the high voltage electric field or emission therebetween.

To supply suitable power, high voltage alternating current is rectified in any suitable manner and the resulting direct current (which is usually pulsating due to the rectifying action) is applied to high voltage electrode 10 through conductor 14. This may be accomplished, for example, by supplying alternating current (110 volts, 60 cycle) to the primary of step-up high voltage transformer T-1. The secondary voltage may be of the general order of 10,000 to 15,000 volts for a small precipitator up to 40,000 to 60,000 volts for a large one. The secondary of transformer T-1 is connected to a suitable rectifier which is here shown as being a mechanical rectifier MR of conventional construction. The rectifier has four stationary shoes, arranged in two pairs 15 and 16, shoes of the two pairs being arranged alternately at 90° intervals around the periphery of a synchronously driven rotor. The transformer secondary is connected to the shoes 15 spaced 180° apart. Of the two remaining shoes 16, one is connected to conductor 14 leading to the precipitator high voltage or discharge electrode 10 while the remaining shoe 16 is ordinarily directly connected through a conductor 17 to collecting electrodes 11 which are ordinarily grounded as at 12. The circuit so far described is entirely conventional in its construction. In accordance with the present invention, my novel protective circuit is connected into the high voltage side of the transformer, said circuit including a current responsive instrument which is typically an ammeter A but which may be in addition to or replaced by other instruments for any purpose, including a feed-back pick-up to obtain a control current for regulating operation of the precipitator. This may be accomplished for example, by inserting the novel protective circuit in series with conductor 17 between shoe 16 and electrode 11, as shown, a switch SW–1 being provided for shorting out the circuit when it is desired to make adjustments. Because of the presence in the circuit of meter A, the circuit in its entirety is hereinafter often referred to as the "meter circuit."

It will be understood that the present invention is not necessarily limited to use with a mechanical rectifier but that any other suitable half-wave or whole-wave rectifier, as for example a vacuum tube type, may be used in place of the mechanical rectifier MR shown in the drawing. Likewise, the meter circuit is placed on the ground side of the rectifier in order to avoid the need for high voltage insulation of the component parts of the circuit but the circuit is not necessarily limited to this particular location.

The meter circuit in a preferred embodiment of the present invention includes ammeter A, shown at the top of the drawing, which may be of any conventional type, and is preferably a recording milliammeter. One terminal of meter A is connected through conductor 22 and precipitator electrode 11, to ground 12. The other terminal of the meter is connected through half-wave rectifier SR–2, conductor 21, resistor R–2, and conductor 23 to conductor 17. The circuit as illustrated schematically shows meter A in series with one output terminal shoe 16 of the mechanical rectifier and the grounded electrode 11 of the precipitator.

The by-pass switch SW–1 is preferably included at such a position that when closed it affords a direct connection between conductor 17 and electrode 11 to ground 12, or, if preferred, directly to ground, thus by-passing the entire protective circuit. This shunt switch may be omitted but is preferably included in the circuit so that it may be closed when it is desired to cut out meter A for any reason, such as to service the meter or to change the recording charts. When switch SW–1 is closed, the precipitator is connected to ground by a low resistance path and the meter circuit can be worked on without requiring the precipitator to be shut down. The switch is normally left open as illustrated in the figure to render the meter circuit and meter A operative.

A surge protector V–1 of any suitable type is preferably connected in parallel with by-pass switch SW–1. This is preferably a gas discharge tube that forms a comparatively low resistance path when discharged, between the mechanical rectifier and ground 12 in order to protect the circuit components in the event of failure of wiring of any of the components. Protector V–1 also operates to take off the peaks of any extremely high voltage surges which may have shorter time constants than the larger inertia characteristics of the filtering circuit which will be described later.

Since meter A is designed to operate upon direct current of a given polarity, it is desirable to include in the meter circuit components to protect the meter against current in the circuit of reversed polarity. A precipitator is designed to operate ordinarily at a given polarity for each of the electrodes; but it very often happens when starting up the precipitator that it is energized at the wrong polarity. The operator generally corrects this situation as soon as he realizes that the polarity is reversed but nevertheless it may continue for some time. Currents of temporarily reversed polarity may also be set up in the meter circuit because of the characteristics of the precipitator and power supply circuit which permit intermittent discharges or bi-polar oscillations. Such protection against reversed polarity is afforded by rectifier SR–2 in conductor 21 to meter A and by shunting surge protector V–1 by a resistor R–1 in series with a half-wave rectifier SR–1, these latter units being connected between conductors 22 and 23. Both the half-wave rectifiers SR–1 and SR–2 are of the fixed type, as for example a selenium rectifier. They are so oriented that current of the proper polarity flows through SR–2 to the meter whereas current of the reverse polarity is blocked by rectifier SR–2 but passes through rectifier SR–1. Thus current of the wrong polarity does not reach the meter A. In order to facilitate by-passing meter A when current of the wrong polarity is flowing, R–1 may have a lower resistance than R–2. For example, R–1 may have a resistance of 500 ohms whereas R–2 has a resistance of 2500 ohms. Resistor R–1 is in series with rectifier SR–1 to limit current through SR–1 to a safe value, larger currents causing tube V–1 to fire and allow the larger current to flow through the surge protector.

In order to prevent the meter from being burned out by excessive current, there are provided a number of component elements in what may be termed the overload section of the meter circuit. This overload section of the circuit comprises resistor R–2, condenser C–2, cold cathode tube V–2 and relay RY–1. It will be noted that there is placed in parallel with resistor R–2 a second resistor R–3, the purpose of which will be later explained but the only effect of this as far as the overload circuit is concerned is to lower the net effective resistance interposed in the circuit by R–2 and for this reason the circuit will now be considered as if it included only a single resistance R–2. Resistor R–2 is in series with the meter and conductor 17 and provided with taps or a slide as indicated at 24 which is connected to one side of condenser C–2, the other side of the condenser being connected to conductor 22. In parallel with the condenser C–2 and in series with slide 24 there is also located the cold cathode tube V–2, and in series with it, relay coil RY–1, one terminal of the relay being connected to V–2 and the other to conductor 22.

When slide 24 is in some position intermediate the ends of resistor R–2, the voltage drop over the portion of the resistor nearer meter A together with the resistance of the rectifier and the meter itself, appears across condenser C–2. Current from the rectifier through meter A and resistor R–2 thus charges condenser C–2 to a potential which is proportional to the current flowing through meter A. No current flows through the tube V–2 until the potential across condenser C–2 and the tube reaches or exceeds a predetermined value. But when the condenser C–2 becomes charged to this predetermined potential, it then discharges through the tube V–2. Current then flows through the tube and relay coil RY–1 to discharge the condenser. The current going through the relay coil RY–1 closes a normally open switch SW–2 shunting the meter A. When this switch is closed, a low resistance path is provided in parallel with and across the terminals of meter A which diverts the excessively heavy current directly to ground 12 through conductor 22 without going through the meter.

Once established, current normally continues to flow through the cold cathode tube V–2 until the potential across the tube drops somewhat below the point at which current flow was initiated. Hence, as long as the current remains above the predetermined value, or close to it, it continues to be diverted around the meter; but when it drops below the lower value at which current flow through the tube V-2 is extinguished, relay RY-1 is deenergized and the contacts at SW-2 are again opened. Under these latter conditions, current once more flows through meter A.

Overload protection is afforded the meter by tube V-2 alone without condenser C-2; but its use is preferred in order to insure positive operation of relay RY-1. When the condenser discharges through the relay, there is sufficient energy released to cause the relay to close switch SW-2 positively and rapidly and there is no danger of an indefinite or hunting action on the part of the relay which would diminish the protection afforded meter A. Movement of slider 24 along resistor R-2 determines the current value in the protective circuit at which breakdown occurs in the cold cathode tube so that this slider can be set at any desired position to establish the predetermined current value above which overload conditions for meter A are considered to exist.

There are incorporated into the protective circuit, elements which act as filters to eliminate the detrimental effects of audio and high frequency pulsations which may be generated in the mechanical rectifier or within the precipitator. Corona flow from the discharge electrode 10 normally generates pulsations in the radio or high frequency range while the arcs at the stationary shoes in the mechanical rectifier produced both audio frequency pulsations and high frequency oscillations. These frequencies are substantially filtered out of the meter circuit before they reach meter A in order that the current recorded there will be the true average value of the current.

These filter elements are arranged in three separate stages. The first stage consists of the two similar resistors R-2 and R-3, which are arranged in parallel with each other but in series with meter A, and condenser C-1 which shunts the resistors and the meter taken together, by connection between conductors 22 and 23. The two resistors R-2 and R-3 are preferably inductively wound to give the circuit a more efficient high frequency filtering effect. The resistors with the condenser form a series tuned circuit across the meter. This stage of filter elements is designed to filter out the high frequency low current pulses induced by the corona flow between electrodes 10 and 11 and, together with resistor R-1 and the two half-wave rectifiers SR-1 and SR-2, operate to rectify and filter out high frequency low current oscillations caused by the arc at the mechanical rectifier MR.

The second filter stage comprises the resistor R-2 and condenser C-2 while the third stage of the filter is made up of the resistive and inductive impedance of meter A and condenser C-3. This last condenser is in parallel with meter A and is connected to the input side of the meter between it and resistor R-2. The second and third filter stages are designed to filter out high current pulsations of audio frequency which are caused by the arcs at the mechanical rectifier.

At times current may flow in the meter circuit at a nominal value which is below the overload value, but the current is pulsing at a frequency which is sufficiently low to cause the ordinary ammeter A to attempt to follow the current fluctuations. These current fluctuations are a normally occurring condition in the circuit caused by continual charging and discharging of the precipitator as the result of any one or more of several different operating conditions. The attempt of the meter to follow the current fluctuations of a low frequency is injurious to the meter itself and ordinarily results in a recording or indication which is either inaccurate or indeterminate. In order to eliminate this fluctuating condition at meter A, and establish an average current value, the current fluctuations are damped. This is accomplished by so selecting the time constants of resistors R-1, R-2 and the condensers C-1, C-2 and C-3, which are the filtering elements just described, that the current fluctuations are damped sufficiently to give a relatively stable meter indication.

Surge protection is of course a particular phase of the general problem of protecting the meter against shock loading as well as sustained overloading. Surges may occur from a number of different causes. For example, normal sparking, but especially an arc-over, between electrodes 10 and 11 produces heavy surges in the circuit and condensers C-2 and C-3 are designed to have sufficient capacity to absorb these surges and smooth out the resultant current through the meter so that it is within the measurement and inertia characteristics of the meter. If these surges have a large current flow they may cause discharge through tube V-2 so that relay RY-1 is energized and the current is temporarily shunted around the meter. As previously mentioned the peak of the surge, when over a predetermined value, is taken off by means of surge protector V-1 which is shunted across all the other elements of the circuit. A similar protection of the same nature may be added by placing another surge protector V-3 in parallel with the meter A but connected to conductor 21 between rectifier SR-2 and resistor R-2. This last surge protector is optional and may not be required in a given circuit but it offers a final protection to the meter. Both the surge protectors V-1 and V-3 level off the peaks of heavy surges and also afford a substantial measure of protection to the meter and to personnel if for any reason relay RY-1 should not be operated to close switch SW-2. Another advantage of protector V-3 is that it protects the remaining circuit components from over-voltage damage in the event of a loose or broken connection within meter A.

The circuit thus far described will work satisfactorily to give a reading of the current due to normal corona discharge between the electrodes 10 and 11 of the precipitator, the various filters and overload devices described being adequate to protect the meter itself. Once the optimum or most satisfactory current is known for best operating efficiency of the precipitator, it is desirable to include in the meter circuit some means to inform an operator or to actuate a current regulating means when the current falls below a predetermined minimum or rises above a predetermined maximum value on either side of this optimum operating value.

For this purpose, there is provided in the meter circuit an undercurrent signal section and an overcurrent signal section, the former section of the circuit serving to signal the operator when the current falls below the minimum current value tolerable and the latter section of the circuit serving to inform the operator when the current is over the maximum set current value tolerable. This maximum value ordinarily is not enough to operate the current surge protectors V-1 or V-3.

The undercurrent signal circuit is thus designed to signal the operator when the current through the meter A has dropped below the pre-selected minimum value, to prevent prolonged inefficient operation of the precipitator in the event of low voltage or retarded input or in the event an open circuit should occur in the power supply. This circuit includes the resistance R-3, slidable resistance tap 25, solenoid coil RY-2, resistance R-4, and switches SW-3 and SW-4. There is also included an isolation transformer T-2 with its associated primary and secondary circuits, and an audible or visual signal indicated S. This transformer is utilized in both the undercurrent signal circuit and over-current signal circuit, and is of the special type required by various safety codes to isolate electrically a circuit that is subject to or exposed to high voltages from another circuit operating at low voltage. Except for safety regulations, transformer T-2 can be dispensed with and switches SW-3 and SW-5 placed directly in the power supply to signal S as is SW-6.

On the primary side of the transformer T-2 is a solenoid or relay with its coil RY-3 in series with the power supply and the transformer primary. The solenoid RY-3 is arranged to close switch SW–6 to operate the signal indicator S when deenergized. That is, when at least a given value of current is flowing through the solenoid coil RY–3, the coil is sufficiently energized that the signal circuit S is open and no signal is given. When sufficient current is not flowing through solenoid coil RY–3, this relay closes the circuit to signal device S, and a signal, which may be a bell or a light or both, will operate to signal the operator. The transformer T–2 functions as a variable impedance element in the signal relay circuit. When the transformer secondary is short-circuited by a circuit including switch SW–3 and switch SW–5, which switches are ordinarily closed during normal operation of the meter circuit, its primary impedance is low permitting sustained operation of the signal relay coil RY–3. When the transformer secondary is on open circuit, however, the primary impedance is high thus causing the primary current to drop below a predetermined value and the signal relay RY–3 to drop out and energize the signal means S.

The slider or tap 25 on resistance R–3 is adjusted to pass a set minimum current through relay coil RY–2 and through resistance R–4 to the conductor 23. As will be explained, switch SW–4 across which resistance R–4 is shunted, is open when the meter circuit is in normal operation. This set minimum current is proportional to the minimum operating current as recorded by ammeter A. Thus, as long as the set minimum current is flowing through relay RY–2, this relay will remain energized and maintain switch SW–3 closed thereby completing the secondary circuit of transformer T–2 and causing only a low impedance to be effective in the primary of transformer T–2. As stated above, this low impedance in the primary circuit sufficiently energizes signal relay coil RY–3 that no signal from S is sent to the operator.

Now should the current between electrodes 10 and 11, which also flows through the meter circuit, fall below the minimum value for proper operation, the current through RY–2 also falls below its set value. The relay coil RY–2 then becomes in effect deenergized, allowing the switch SW–3 to open and also closing the switch SW–4. Opening switch SW–3 in the transformer T–2 secondary is reflected in a high impedance in the primary, permitting signal relay coil RY–3 to become sufficiently deenergized to close the signal circuit S and sound a horn or turn on a light.

Resistance R–4 is connected in shunt across switch SW–4, and in series with RY–2 to compensate for normal operating characteristics of a relay such as may be used at RY–2. It reduces the current through the relay coil RY–2 when the switch SW–4 is open as compared with the current flowing through the coil when the switch is closed. Upon effective deenergization of the relay RY–2 as just described, switch SW–4 assumes its closed position, cutting out the effect of resistance R–4 and increasing the current flowing in coil RY–2 for a given current flowing through meter A. The value of R–4 is such as to compensate for the difference in current value at which relay RY–2 drops out and the higher value at which it picks up. Consequently signal S is started and subsequently stopped at close to the same actual current at meter A. Accordingly when at least the minimum current is again being passed through the meter A, RY–2 will be energized to open switch SW–4 and close switch SW–3. With the switch SW–3 closed a low impedance is reflected into the primary of transformer T–2 and relay coil RY–3 is energized again, turning off the signal S. Opening switch SW–4 will again place the relay coil RY–2 and resistance R–4 in series so that the relay will not be deenergized until the current through the meter A drops below the minimum current value set.

The overcurrent signal circuit utilizes the transformer T–2 and a further switch SW–5 in series with switch SW–3 in the secondary of this transformer. Switch SW–5 is normally closed and connected to be actuated by the relay RY–1 shown connected between the surge protector V–2 and conductor 22 in the meter circuit. Thus the maximum current tolerable by the meter A is set by adjusting the tap 24 on resistance R–2. When the current exceeds this value, the condenser C–2 discharges through the tube V–2 as explained previously, energizing the relay coil RY–1 to close the normally open switch SW–2. This relay will also open the normally closed switch SW–5. Opening switch SW–5 in the secondary of T–2 then reflects a high impedance in the primary of the transformer T–2 thereby deenergizing the signal relay coil RY–3 to cause the signal circuit S to sound a horn or turn on a light in the same manner as when the secondary circuit of transformer T–2 was opened by operation of the relay coil RY–2 and switch SW–3. It is thus seen that not only is the meter A protected against an overload by closing of the switch SW–2 in the meter circuit, but also the existence of the overload causes a signal to be sounded to inform the operator of this current overload.

It is thus seen that in accordance with my invention I have provided a circuit which permits a meter to be permanently placed in the high voltage side of an electrical precipitator to give an accurate and continuous indication of the current resulting from corona discharge and permit adjustment of the apparatus for maximum efficiency in such operation. The same basic circuit may also include sections or elements that signal underloads or overloads. The recording meter may be replaced by or used in conjunction with other instruments. Obviously various changes in the arrangement and design of the elements of my improved circuit may be made by persons skilled in the art without departing from the spirit and scope of my invention. Accordingly it is to be understood that the above description is considered to be illustrative of and not limitative upon the invention as defined in the appended claims.

I claim:

1. A meter circuit for use in a high voltage circuit energizing an electrical precipitator having a pair of opposing electrodes, comprising: a meter connected in series between one of said electrodes and a high voltage source; a normally open switch means shunting said meter; actuating means connected between said one electrode and said high voltage source in parallel with the meter and operative upon energization to close said switch means; a discharge tube connected in series with said actuating means; and a condenser shunting the series connected discharge tube and actuating means, one side of the condenser also being connected to one terminal of said meter and one side of said high voltage source, and the other side of said condenser tapping a resistance, said resistance being connected between the other side of said meter and the other side of said high voltage source whereby a voltage will build up across said condenser proportional to current flowing through said resistance and meter due to the voltage drop across said resistance and meter, said discharge tube being adapted to discharge at a given overload potential built up across said condenser, said discharge serving to energize said actuating means.

2. A meter circuit for use in a high voltage circuit energizing an electrical precipitator having a pair of opposing electrodes, comprising: a meter connected in series between one of said electrodes and a high voltage source; and a signalling circuit for indicating when current flow through said meter falls outside a given range, said signalling circuit including a first means for indicating when said current flow drops below a given minimum value, and a second means for indicating when said current flow exceeds a given maximum value; said first means including a first resistance in series with said meter, a first actuating means shunting a portion of said first resistance and responsive to current through said resistance, said first actuating means being coupled to said signalling circuit whereby said signalling circuit is responsive to deenergization of said first actuating means, and said first actuating means being deenergized only when the current through said resistance falls below a given minimum value.

3. The subject matter of claim 2, in which said second means includes a second resistance in series with said meter, a second actuating means shunting said meter and a portion of said second resistance, a condenser shunting said second actuating means whereby said condenser will have a potential developed across it proportional to current flow through said second resistance and meter, said second actuating means being coupled to said signalling circuit whereby said circuit is responsive to energization of said second actuating means, said second actuating means being energized when the potential across said condenser reaches a predetermined maximum value.

4. A meter circuit for use in a high voltage circuit energizing an electrical precipitator having a pair of opposing electrodes, comprising: a meter connected in series between one of said electrodes and a high voltage source; and a signalling circuit for indicating when current flow through said meter falls outside a given range, said signalling circuit including a first means for indicating when said current flow drops below a given minimum value, and a second means for indicating when said current flow exceeds a given maximum value; said second means including a second resistance in series with said meter; a second actuating means shunting said meter and a portion of said second resistance, and a condenser shunting said second actuating means whereby said condenser will have a potential developed across it proportional to current flow through said resistance and meter; said second actuating means being coupled to said signalling circuit whereby said circuit is responsive to energization of said second actuating means, and said second actuating means being energized when the potential across said condenser reaches a pre-determined maximum value.

5. A meter protective circuit adapted to be connected between a high voltage source and a grounded electrode of an electrical precipitator, comprising: a current responsive instrument connected in series between said high voltage source and the grounded electrode; a normally open switch means shunting said instrument; a resistance connected in series with one side of said current responsive instrument and with the high voltage source; actuating circuit means operative upon energization to close said switch means, said actuating circuit means being connected to the other side of said current responsive instrument and tapping said resistance whereby a voltage can be built up across said switch actuating circuit means; and a discharge tube in parallel with said normally open switch means and connected at one side between said high voltage source and said resistance and connected at the other side to said other side of the current responsive instrument.

6. A meter circuit for use in a high voltage circuit energizing an electrical precipitator having a pair of opposing electrodes, comprising: a meter connected in series between one of said electrodes and a high voltage source; a normally open switch means shunting said meter; actuating means connected between said one electrode and said high voltage source in parallel with the meter and operative upon energization to close said switch means; a discharge tube connected in series with said actuating means; and a condenser shunting the series connected discharge tube and actuating means, one side of the condenser also being connected to one terminal of said meter and one side of said high voltage source, and the other side of said condenser tapping a resistance, said resistance being connected between the other side of said meter and the other side of said high voltage source whereby a voltage will build up across said condenser proportional to current flowing through said resistance and meter due to the voltage drop across said resistance and meter, said discharge tube being adapted to discharge at a given overload potential built up across said condenser, said discharge serving to energize said actuating means; and a signalling circuit for indicating when current flow through said meter falls outside a given range, said signalling circuit including a first means for indicating when said current flow drops below a given minimum value, and a second means for indicating when said current flow exceeds a given maximum value.

7. A meter circuit for use in a high voltage circuit energizing an electrical precipitator having a pair of opposing electrodes, comprising: a meter connected in series between one of said electrodes and a high voltage source; and a signalling circuit for indicating when current flow through said meter falls outside a given range, said signalling circuit including a resistance in series with said meter, actuating means shunting a portion of said resistance and responsive to current through said resistance; said actuating means being coupled to said signalling circuit whereby said signalling circuit is responsive to deenergization of said actuating means, and said actuating means being deenergized only when the current through said resistance falls below a given minimum value.

8. A meter circuit for use in a high voltage circuit energizing an electrical precipitator having a pair of opposing electrodes, comprising: a meter connected in series between one of said electrodes and a high voltage source; and a signalling circuit for indicating when current flow through said meter falls outside a given range, said signalling circuit including a resistance in series with said meter, actuating means shunting said meter and a portion of said resistance, and a condenser shunting said actuating means whereby said condenser will have a potential developed across it proportional to current flow through said resistance and said meter; said actuating means being coupled to said signalling circuit whereby said signalling circuit is responsive to energization of said actuating means, and said actuating means being energized when the potential across said condenser reaches a predetermined maximum value.

References Cited in the file of this patent

UNITED STATES PATENTS

| 1,976,569 | Levy | Oct. 9, 1934 |
| 2,247,361 | Corbitt | July 1, 1941 |
| 2,451,953 | Ingram | Oct. 19, 1948 |

FOREIGN PATENTS

| 313,208 | Great Britain | June 10, 1929 |
| 521,316 | Great Britain | May 17, 1940 |
| 557,336 | Great Britain | Nov. 16, 1943 |
| 609,989 | France | Aug. 27, 1926 |